March 22, 1932.  M. LOTHROP  1,850,405
VEHICLE BRAKE
Filed Nov. 23, 1925
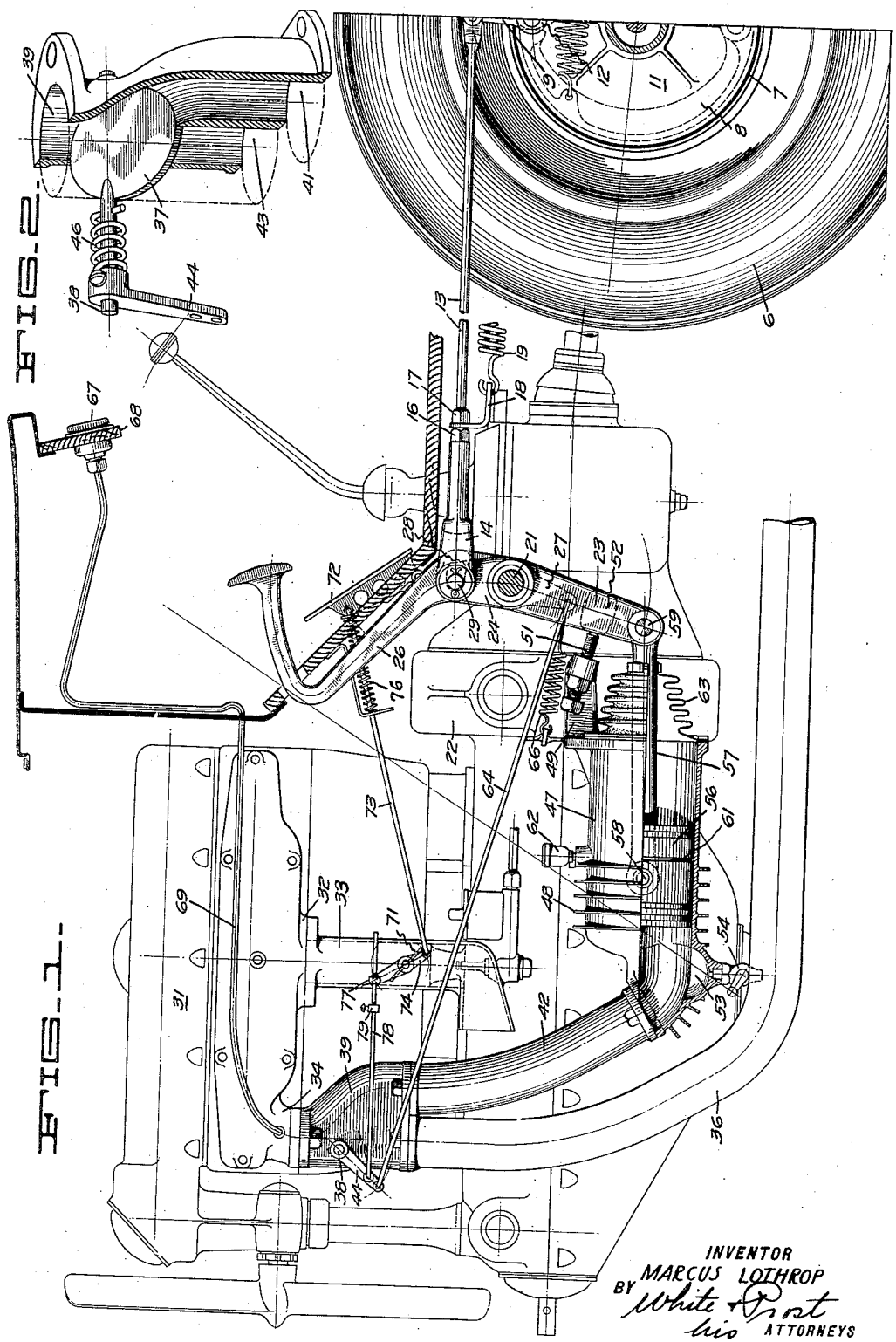
INVENTOR
MARCUS LOTHROP
BY White ...
his ATTORNEYS Patented Mar. 22, 1932

1,850,405

UNITED STATES PATENT OFFICE

MARCUS LOTHROP, OF BERKELEY, CALIFORNIA

VEHICLE BRAKE

Application filed November 23, 1925. Serial No. 70,736.

My invention relates to vehicle brakes and especially to power operated automobile brakes.

An object of my invention is to provide a brake operated by back pressure in the exhaust manifold of the vehicle to which it is applied.

Another object of my invention is to provide an exhaust back pressure operated brake in which the exhaust manifold back pressure is increased to operate the brakes.

The invention possesses other advantageous features, some of which with the foregoing, will be set forth at length in the following description, where I shall outline in full that form of vehicle brake of my invention which I have selected for illustration in the drawings accompanying and forming part of the present specification. In said drawings I have shown but one form of vehicle brake embodying my invention, but it is to be understood that I do not limit myself to such form since the invention, as set forth in the claims, may be embodied in a plurality of forms.

In the drawings:

Figure 1 is an elevation of a portion of an automobile showing the vehicle brake of my invention as installed. Various portions of the automobile are eliminated to render the figure more simple.

Figure 2 is a detail view of the throttle valve in the exhaust manifold, a portion of the exhaust manifold being broken away to simplify the figure.

Broadly speaking, my invention comprises a brake for an automobile which is operated by back pressure generated in the exhaust manifold of the automobile.

I have found that by constricting the outlet of the exhaust pipe of an automobile engine, the speed of the vehicle may be substantially checked. The exhaust gases are discharged into the exhaust manifold and, having no means of escape, create a back pressure which retards the engine, and consequently the vehicle. A control operated by the driver of the automobile may be connected to a valve suitably placed to constrict the outlet of the exhaust manifold, and proper manipulation of the control will then serve to retard the vehicle. I prefer also to utilize the back pressure generated in the exhaust manifold to apply brakes mounted on the vehicle wheels in the ordinary way.

In an automobile of the conventional type equipped with the brake of my invention, the rear wheel 6 is provided with a brake drum 7 acted upon by a brake shoe 8. A lever 9 is suitably mounted on the brake plate 11 and actuates a cam 12. Movement of lever 9 to the left in Fig. 1, which will hereinafter be termed "forward" forces the brake shoe 8 against the drum 7 thereby applying the brake. A brake rod 13 is connected at one end to lever 9 and is provided at the other end with an adjustable clevis 14 held in place by suitable nuts 16 and 17 which also secure a clip 18 on the rod. A spring 19 engages clip 18 and is properly anchored to urge rod 13 and its cooperating linkage backward, or to the right in Fig. 1.

A stub shaft 21 is supported on the power plant 22 and carries a lever having a lower arm 23 and an upper arm 24, and a brake pedal 26 formed with a depending arm 27. The clevis 14 and the upper lever arm 24 are pierced by circular apertures and the brake pedal is provided with an arcuate slot 28 to accommodate a pin 29 passing thru both apertures and the slot and properly retained therein.

As so far described, the brake mechanism is but little different from a conventional braking system and the brakes may be applied in the usual manner. The operator of the vehicle by pushing downwardly on pedal 26 takes up the lost motion in the linkage, caused by the movement of the slot 28 around pin 29, and then draws the brake rod 13 forward, applying the brakes.

The engine 31 is of the internal combustion type generally used in automobiles, and is provided with an intake manifold 32 carrying a carburetor 33, and with an exhaust manifold 34 communicating with an exhaust pipe 36.

Means are provided for restricting the outlet of the exhaust manifold 34, so that a back pressure, or pressure above atmospheric pressure, may be created therein by the exhaust gases flowing from the engine. Any sort of adjustable valve which will close the outlet of the exhaust manifold is suitable for this purpose, but preferably I provide a throttle or butterfly valve 37 pivoted on an eccentrically placed axle 38 in a housing 39 which is secured between the exhaust manifold 34 and the exhaust pipe 36. The housing 39 is branched to form two outlet passages for the exhaust gases and is shaped properly to accommodate the butterfly valve 37 in all positions thereof. When the valve 37 is positioned as shown in Fig. 2, the gases are constrained to flow thru passage 41 into a conduit 42 which will be described later. When the valve is in a vertical position, the gases are free to flow thru passage 43 into the exhaust pipe 36. Means are provided for rendering a steady pressure and for minimizing the effects of sudden increases in pressure, such as backfires. As Fig. 2 shows in detail, axle 38 carries a lever 44 mounted so that it may be rotated on the axle. A spiral spring 46 is attached at one end to the axle and at the other end is secured to lever 44. It will be appreciated that the valve is slightly unbalanced because of the eccentric placing of the axle so that sudden increases or decreases of pressure will cause movement of the valve to compensate therefor. The valve movements are absorbed by the spiral spring which nevertheless transmits the motion of lever 44 to the valve.

Pressure built up by the exhaust manifold when valve 37 is closed, is transmitted thru conduit 42 to a cylinder 47 provided with cooling fins 48 suitably mounted on the power plant. The cylinder casting is extended to form an arm 49 carrying a screw 51 which bears against a lug 52 for limiting the movement of the lower arm 23. A collecting well 53 is also formed in the cylinder casting in which liquid condensed from the exhaust gases may gather, and from which it may be drained by means of a petcock 54 controlled, if desired, from the driver's compartment of the vehicle. A piston 56 is fitted in cylinder 47 and is joined by a connecting rod 57 and suitable pins 58 and 59 to the lower arm 23. The piston is provided with a groove 61 for distributing on the cylinder walls lubricant from a cup 62 mounted on the cylinder casting. A flexible gaiter 63 is joined to the cylinder casting and to the connecting rod to exclude dirt and dust from the cylinder.

In order that the vehicle driver may variously position the butterfly valve 37 to control the amount of back pressure, the depending arm 27 associated with brake pedal 26 is joined by a control rod 64 to lever 44 governing valve 37. A spring 66 attached to the power plant opposes the opening movement of the valve and is made sufficiently strong normally to take up the lost motion of the brake pedal about pin 29 and keep the pedal and exhaust butterfly valve linkage in the off, or no back pressure, position.

With the mechanism as so far described, and with the vehicle engine operating, the brakes are applied in the following manner. The brake pedal is slightly depressed which, on account of the lost motion between the pedal and pin 29, has no effect upon upper arm 24 or clevis 14 but which immediately imparts a corresponding motion thru depending arm 27 and control rod 64 to lever 44, thereby partially closing the valve and creating a proportionate amount of back pressure. The back pressure exists in the exhaust manifold, conduit 42, and cylinder 47 and forces the piston backward in the cylinder. The piston, being attached to connecting rod 57, moves lower arm 23 backward. Upper arm 24, which is associated with lower arm 23, is consequently drawn forward and, thru pin 29 and clevis 14, applies the brakes. Since the pin 29 has moved forward, the brake pedal may be further depressed without directly transmitting its movement to the brake linkage. Further depression of the pedal closes valve 37 an additional amount, creating more back pressure and applies the brakes more fully. The brakes themselves and spring 19 oppose the pressure in brake cylinder 47, and for any given pedal position and corresponding back pressure a certain position of the linkage and degree of brake application are obtained.

The amount of gas pressure in the manifold may be indicated by a suitable gage 67 mounted on the instrument board 68 of the vehicle and connected by a tube 69 to the exhaust manifold.

It has been found that a high back pressure in the exhaust manifold will reduce the engine speed greatly and sometimes will cause the engine to cease operating altogether. It is necessary to maintain the running of the engine though only at a slow speed to insure the operation of the present braking system and for that reason means are provided for increasing the pressure in the intake manifold and supplying more fuel to the engine when the exhaust pressure becomes great.

The intake throttle valve 71 in the carburetor 33 is controlled by the usual pedal 72 connected thru a rod 73 to an arm 74 which rotates the valve. A spring 76 urges the intake throttle linkage to off, or throttle closed position. Depression of pedal 72 opens the normally closed valve 71 in the usual fashion. Arm 74 is extended and at its upper end 77 slidably carries a rod 78 which at its other end is pivoted to lever 44. An adjustable collar 79 is carried by rod 78 and is positioned to bear against the upper end 77 and open valve 71 as valve 37 is closed. The collar is adjusted and the linkage is proportioned so that the intake throttle 71 is opened just sufficiently to offset the retarding effect on the engine of the closure of valve 37. In that manner, no matter what the back pressure, the operation of the engine is maintained.

When the vehicle operator depresses the brake pedal it first moves slightly with respect to pin 29 and causes a small back pressure which moves the pin forward. There is a slight lag so that as the pedal is depressed the pin moves in substantial unison with it but there is no engagement between the pin and the pedal. If the pedal is depressed nearly the whole amount in order to effect a nearly full application of the brakes, the intake throttle valve may be opened a slight and proportionate amount to prevent stalling of the engine. Applying the brakes a small amount may not necessitate opening the intake throttle valve. Should the gas pressure mechanism fail to work for any reason, the lost motion between the brake pedal and pin 29 would quickly be overcome and the brake applied by manual force in the customary way.

It will be understood that the vehicle brake of my invention provides a mechanism by means of which pressure of the exhaust gases from the vehicle engine relieves the driver of the work of applying the brakes.

I claim:

1. In a vehicle having an internal combustion engine, an exhaust manifold for said engine and in which the pressure is pulsating, a butterfly valve mounted on an eccentric axle and extending into said manifold, a manually controlled lever arm loosely mounted on said axle, and a spring connecting said axle and said lever.

2. In a mechanism operated by the exhaust back pressure of an internal combustion engine, means for increasing the intake manifold pressure, and means for increasing the exhaust manifold pressure simultaneously and in a predetermined ratio.

3. In a vehicle, a brake on said vehicle, an internal combustion engine, an intake manifold for said engine, an exhaust manifold for said engine, a stationary cylinder on said vehicle, a movable piston in said cylinder, mechanism connecting said piston and said brake whereby said brake is applied by movement of said piston outwardly in said cylinder, a throttle valve in said intake manifold, a second throttle valve in said exhaust manifold, closure of said second throttle valve causing a back pressure in said exhaust manifold, means for closing said second throttle valve and simultaneously opening said first named throttle valve, and a conduit for communicating the back pressure in said exhaust manifold to said cylinder whereby said brake is applied.

4. In a mechanism operated by the exhaust back pressure of an internal combustion engine, means for increasing the exhaust manifold pressure and means for increasing the intake manifold pressure in proportion thereto.

In testimony whereof, I have hereunto set my hand.

MARCUS LOTHROP.